US009166996B2

(12) United States Patent
Guarnieri et al.

(10) Patent No.: US 9,166,996 B2
(45) Date of Patent: *Oct. 20, 2015

(54) AUTOMATIC CORRECTION OF SECURITY DOWNGRADERS

(71) Applicant: INTERNATIONAL BUSINESS MACHINES CORPORATION, Armonk, NY (US)

(72) Inventors: Salvatore A. Guarnieri, New York, NY (US); Marco Pistoia, Amawalk, NY (US); Omer Tripp, Har-Adar (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/029,065

(22) Filed: Sep. 17, 2013

(65) Prior Publication Data

US 2014/0237605 A1 Aug. 21, 2014

Related U.S. Application Data

(63) Continuation of application No. 13/768,645, filed on Feb. 15, 2013.

(51) Int. Cl.
*G06F 21/00* (2013.01)
*H04L 29/06* (2006.01)
*G06F 21/57* (2013.01)

(52) U.S. Cl.
CPC .......... *H04L 63/1433* (2013.01); *G06F 21/577* (2013.01); *G06F 2221/034* (2013.01)

(58) Field of Classification Search
CPC .......................... H04L 63/1433; G06F 21/577
USPC ........................................................... 726/25
See application file for complete search history.

(56) References Cited

U.S. PATENT DOCUMENTS

| 6,883,101 B1 * | 4/2005 | Fox et al. ........................ 726/25 |
| 2002/0073313 A1 | 6/2002 | Brown et al. |
| 2007/0169199 A1 * | 7/2007 | Quinnell et al. ................. 726/25 |
| 2011/0078798 A1 * | 3/2011 | Chen et al. ....................... 726/25 |
| 2011/0088023 A1 | 4/2011 | Haviv et al. |
| 2011/0302566 A1 * | 12/2011 | Abadi et al. .................. 717/168 |

(Continued)

OTHER PUBLICATIONS

"Dynamic Cascade Vulnerability Checks in Real-World Networks";Craddock et al; partial of 6th layered assurance workshop proceedings, 70 pages, applied computer security accociates; 2012.*

(Continued)

*Primary Examiner* — Jason Lee
(74) *Attorney, Agent, or Firm* — Tutunjian & Bitetto, P.C.; Anne V. Dougherty

(57) ABSTRACT

Systems for automatic correction of security downgraders include a security analysis module configured to perform a security analysis that disregards existing user-provided downgraders to detect flows that are vulnerable; and an enhancer module configured to locate candidate downgraders on the flows, to determine whether each of the candidate downgraders protects against all vulnerabilities associated with each downgrader's respective flow, and to transform candidate downgraders that do not protect against all of the associated vulnerabilities such that the transformed downgraders do protect against all of the associated vulnerabilities.

10 Claims, 3 Drawing Sheets

(56) References Cited

U.S. PATENT DOCUMENTS

2012/0023486 A1    1/2012   Haviv et al.
2012/0159619 A1    6/2012   Berg et al.
2012/0324582 A1*  12/2012   Park ............................... 726/25

OTHER PUBLICATIONS

Anonymous. "Verifying the Correctness of Multistep Downgrading Operations" IP.com Prior Art Database. Nov. 2011. (3 Pages).

International Business Machines Corporation. "Message Control Mechanisms for Performance and Convenience" IP.com Prior Art Database. Apr. 2009. (5 Pages).

Klensin, J., et al. "Overview and Framework for Internationalized Email (RFC4952)" IP.com Prior Art Database. Jul. 2007. (22 Pages).

Tateishi, T., et al. "Path- and Index-Sensitive String Analysis Based on Monadic Second-Order Logic" 2011 International Symposium on Software Testing and Analysis (ISSTA). Jul. 2011. pp. 166-176.

* cited by examiner

AUTOMATIC CORRECTION OF SECURITY DOWNGRADERS

RELATED APPLICATION INFORMATION

This application is a Continuation application of co-pending U.S. patent application Ser. No. 13/768,645 filed on Feb. 15, 2013, incorporated herein by reference in its entirety.

BACKGROUND

1. Technical Field

The present invention relates to security analysis and, more particularly, to automatic correction and enhancement of user-implemented security downgraders.

2. Description of the Related Art

Static security analysis typically takes the form of taint analysis, where the analysis is parameterized by a set of security rules, each rule being a triple <Src,San,Snk>, where Src denotes source statements that read untrusted user inputs, San denotes downgrader statements that endorse untrusted data by validating and/or sanitizing it, and Snk denotes sink statements which perform security-sensitive operations. Given a security rule R, any flow from a source in $Src_R$ to a sink in $Snk_R$ that doesn't pass through a downgrader from $San_R$ comprises a potential vulnerability. This reduces security analysis to a graph reachability problem.

Traditionally, the goal of security analysis has been to detect potential vulnerabilities in software applications (mostly web applications) and to inform the user of these problems. The user would then apply a fix, typically by introducing a downgrader (such as a sanitizer or validator function) into the flow of the computation. For example, if an analysis tool were to discover that an application is able to read user-provided data (e.g., an HTTP parameter) and then use this data in a security-critical operation (e.g., writing it to a database or to a log file), then one of the flows extending between these two endpoints would be reported to the user. Such a flow is a security risk, as it potentially allows users to corrupt or subvert the security-critical operation.

To remedy the problem, the user would install one or more security checks covering all flows between the endpoints to ensure that data reaching the security-sensitive operation is benign by, e.g., transforming it through sanitization, or to reject the data through validation. This solution is limited, however, in that the tool assumes, rather than verifies, that the security checks inserted by the user are correct. Implementing and using downgraders correctly is highly nontrivial, and users are prone to making errors. In particular, there are many end-cases to account for, the correctness of a check often depends on the deployment configuration of the software system (e.g., the type of backend database), and the context where the vulnerability occurs also partially determines what needs to be check. A user may err either in tool configuration, e.g., by defining incorrect downgraders, or in the remediation of reported vulnerabilities.

SUMMARY

A method for automatic correction of security downgraders is shown that includes performing a security analysis that disregards existing user-provided downgraders to detect flows that are vulnerable; locating candidate downgraders on said flows; determining whether each of the candidate downgraders protects against all vulnerabilities associated with each downgrader's respective flow; and transforming with a processor candidate downgraders that do not protect against all of the associated vulnerabilities, such that the transformed downgraders do protect against all of the associated vulnerabilities.

A method for automatic correction of security downgraders is shown that includes performing a security analysis that disregards existing user-provided downgraders to detect flows that are vulnerable; generating a set of test inputs for each vulnerable flow that includes at least one test input that exploits each vulnerability associated with the vulnerable flow; locating candidate downgraders on said flows; determining whether each of the candidate downgraders protects against all vulnerabilities associated with each downgrader's respective flow by providing the set of test inputs for each flow to each of the respective candidate downgraders to determine whether said candidate downgraders correctly downgrade the input; and transforming with a processor candidate downgraders that do not protect against all of the associated vulnerabilities by adding a validating or sanitizing step to the candidate downgraders that checks for a known vulnerability, such that the transformed downgraders do protect against all of the associated vulnerabilities.

A system for automatic correction of security downgraders is shown that includes a security analysis module configured to perform a security analysis that disregards existing user-provided downgraders to detect flows that are vulnerable; and an enhancer module comprising a processor configured to locate candidate downgraders on said flows, to determine whether each of the candidate downgraders protects against all vulnerabilities associated with each downgrader's respective flow, and to transform candidate downgraders that do not protect against all of the associated vulnerabilities such that the transformed downgraders do protect against all of the associated vulnerabilities.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide for the remediation of security issues in software systems by first detecting an existing downgrader along a path between a source and a sink, and second attempting to fix or enhance that downgrader. Developers often apply checks to user input to verify its validity but, as noted above, often do so incorrectly or incompletely. However, there is often at least some existing check along a path that is available to be "boosted." Developers further prefer to make organic changes, such that modifying existing checks is preferable to introducing new checks. Furthermore, introducing new downgrader code might cause problems or redundancy errors if overlapping code already exists along the flow. For example, repeating a downgrader that performs an encoding would result in a double-encoding, which could corrupt the input. As such, embodiments of the present invention use instances of existing downgrader code and enhance it.

Figure 1:
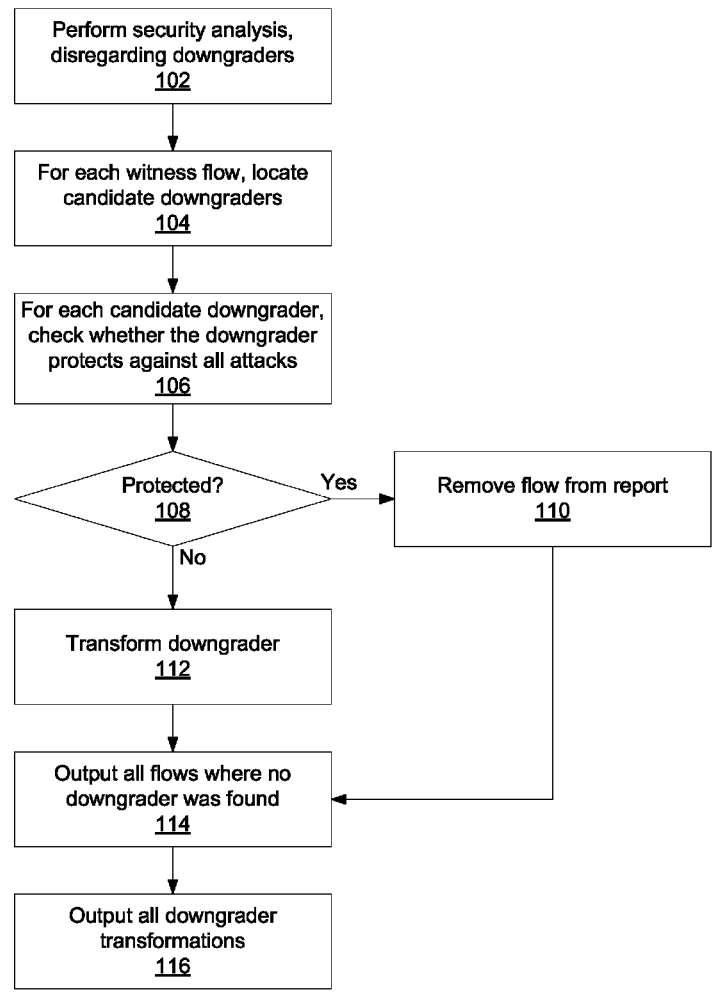
FIG. 1 is a block/flow diagram of a method for enhancing a downgrader in accordance with an embodiment of the present invention.

Referring now to the drawings in which like numerals represent the same or similar elements and initially to FIG. 1, a method for automatic correction of security downgraders is shown. Block 102 performs a security analysis, disregarding any pre-existing, user-provided downgraders in the tool configuration. For each witness flow W of type T, block 104 finds candidate downgraders along the flow W. A witness flow W is a representative vulnerable flow (e.g., a shortest flow). A flow "type" refers to a class of potential security vulnerabilities. For example, some flows will be vulnerable to cross-site scripting (XSS) attacks, others will be vulnerable to structured query language (SQL) injection (SQLi) attacks, etc. A single flow may be vulnerable to multiple types of attack and so may have multiple types. The following shows an example of vulnerable flows:

String name=request.getParameter("name"); // Source
String nameEntry="entry:"+name;
response.getWriter( ).println(nameEntry); // XSS sink
Statement.execute(makeSql(nameEntry)); // SQLi sink This shows two vulnerable flows. The first is from the source to the first sink, and is of type XSS, and the second is to the second sink, and is of type SQLi. In both cases, untrusted information coming from the user (the source) flows into a security-sensitive operation (the sink), without first being sanitized/validated. This makes it possible for a user to provide an input to either of the sinks that may disrupt functionality or lead to an elevation of the user's rights in the system.

Detecting candidate downgraders in block 104 can be performed in several ways. One way is to apply the analysis of a security tool where syntactic properties of called methods are used to highlight candidate downgraders. Another heuristic is to utilize the ignored parts of the user configuration, which indicate the methods that the user considers to act as downgraders. Additional techniques for finding downgraders may include searching for data-flow bottlenecks and by scanning user configuration files.

For each candidate downgrader found, block 106 checks whether the downgrader protects all attack types corresponding to the flows that the downgrader participates in. This may be accomplished by providing a set of test inputs to the candidate downgrader. Block 106 generates a list of vulnerabilities that the candidate downgrader fails to protect again. Block 108 then considers whether each of the checked candidate downgraders are fully protected.

If block 108 determines that a given downgrader fully protects a flow W (i.e., if block 106 determines that the downgrader provides a correctly sanitized/validated output for every test input), the flow W is removed from the list at block 110. Otherwise, block 112 transforms the downgrader to make it sufficient to prevent attacks of the relevant types. One possibility for augmenting the logic of an incomplete downgrader is to equip the analysis tool with a set of security checks that, together, form a correct downgrader. When an incomplete downgrader is detected, the analysis tool attempts to add to it individual missing checks. After each conjunction, an analysis tool can determine whether the result is a correct downgrader. If not, then the process continues and additional checks are added. This process is guaranteed to terminate with a correct downgrader, because the checks are designed such that the conjunction of all the individual checks is a correct downgrader.

Adding checks to a downgrader may be performed directly, if access to the downgrader code is available. In some cases, however, security analysis may be performed on flows that use precompiled libraries or executables, where a downgrader may be opaque to the user. In such a case, a downgrader may be injected into the existing downgrader binary code. Alternatively, a downgrader may be enhanced by adding checks to the downgrader's flow output, essentially concatenating the enhancing checks with the existing downgrader.

Block 112, as described above, "transforms" a downgrader by supplementing it with additional validators and/or sanitizers. A given flow may be vulnerable to a wide variety of attack types, and each such attack type should be accounted for. In the example of a string-processing flow, where user inputs are passed to a security-critical resource, each potential sanitizer/validator may simply be concatenated, as each step will simply produce a sanitized/validated string for the next step. In the case of a validator, where an input that fails is simply rejected, concatenation of individual validators is intuitive regardless of flow type.

Block 114 outputs to the user all of the flows where no candidate downgrader was found at all, allowing the user to institute an appropriate downgrader for the flow, while block 116 reports all of the downgrader transformations that were performed in block 112. In this way, the user is made aware of all substantive changes to the program, and is furthermore shown the places where the security of the program could be further improved. In an alternative embodiment, block 112 may introduce new downgraders in vulnerable flows that have no downgrader at all. In such an embodiment, block 116 also provides information regarding new downgraders that were added.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 2:
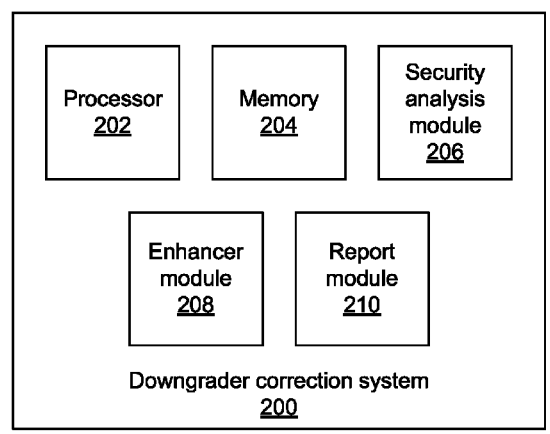
FIG. 2 is a diagram of a downgrader correction system in accordance with an embodiment of the present invention.

Referring now to FIG. 2, a downgrader correction system 200 is shown. The downgrader correction system 200 includes a processor 202 and memory 204. A security analysis module 206 uses processor 202 to perform a security analysis on a program stored in memory 204. An enhancer module 208 reviews the analysis provided by security analysis module 206 to locate candidate downgraders in the program's flows and determines whether any of those downgraders fail to provide for all of the potential vulnerabilities in the flows. For each downgrader that provides insufficient protection, the enhancer module 208 adds additional checks until the downgrader is able to fully protect the flow. The report module 210 then generates a report to the user that includes, e.g., a description of all vulnerable flows that lack a downgrader and a description of all enhancements made to the existing downgraders.

Figure 3:
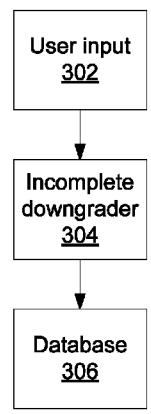
FIG. 3 is an exemplary vulnerable data flow prior to correction/enhancement in accordance with an embodiment of the present invention.

Referring now to FIG. 3, an exemplary data flow is shown. At block 302 a user provides some input. For example, the user desires to perform a search and enters the search terms as a string. Block 304 receives the input and performs some elementary validation. For example, block 304 may check to determine whether the string is a null string and whether it has the correct format for a search query. If the input fails these tests, then block 304 may reject the query and provide an error message. If the downgrader concludes that the string meets its requirements, then the string is passed to database 306 and executed.

However, in the present example, the downgrader 304 is incomplete and does not protect against potential attacks. As an example, consider an incomplete downgrader 304 that fails to sanitize user inputs to protect against SQL injection attacks. Such an attack allows the malicious user to provide direct commands to database 306, allowing the user to have access to sensitive information, such as credit cards and passwords. If the downgrader 304 does not provide, for example, filtering of escape characters or strong typing of the input 302, then there is nothing to prevent such attacks.

Figure 4:
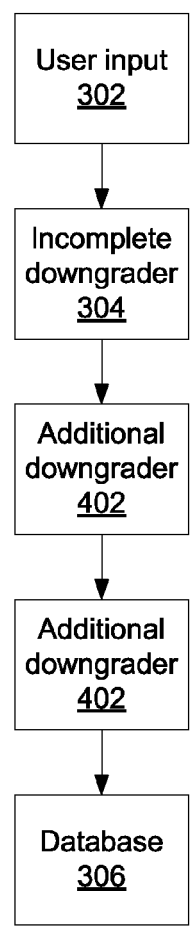
FIG. 4 is an exemplary data flow having an enhanced downgrader in accordance with an embodiment of the present invention.

Referring now to FIG. 4, the exemplary flow described above is shown again, after having had its downgrader 304 enhanced according to an embodiment of the present invention. Rather than replacing the incomplete downgrader 304, individual sanitization/validation downgraders 402 are placed in the data flow. For example, each additional downgrader 402 may check for a particular control or escape character or sequence which should be removed from the input. The additional downgraders 402 may simply be added into the flow after the incomplete downgrader 304, performing whatever additional processing is needed to fully protect the flow from any detected vulnerabilities. Any number of additional downgraders 402 may be added in this way.

Having described preferred embodiments of a system and method for automatic correction of security downgraders (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for automatic correction of security downgraders, comprising:
 a security analysis module configured to perform a security analysis that disregards existing user-provided downgraders to detect flows that are vulnerable; and
 an enhancer module comprising a hardware processor configured to locate candidate downgraders on said flows, to determine whether each of the candidate downgraders protects against all vulnerabilities associated with each downgrader's respective flow, and to transform candidate downgraders that do not protect against all of the associated vulnerabilities such that the transformed downgraders do protect against all of the associated vulnerabilities.

2. The system of claim 1, wherein the enhancer module is further configured to add a validating or sanitizing step to the candidate downgraders that checks for a known vulnerability.

3. The system of claim 2, wherein the enhancer module is further configured to concatenate the added validating or sanitizing step with an existing candidate downgrader in a respective flow.

4. The system of claim 2, wherein the enhancer module is further configured to inject the added validating or sanitizing step into an existing precompiled candidate downgrader in a respective flow.

5. The system of claim 2, wherein the enhancer module is further configured to repeat the determination and transformation until each candidate downgrader has been enhanced to address all known vulnerabilities associated with candidate downgrader's respective flow.

6. The system of claim 1, further comprising a report module configured to generate a report that includes information regarding flows that have no downgrader and a list of transformations made to the candidate downgraders.

7. The system of claim 1, wherein the enhancer module is further configured to provide a set of test inputs to each of the candidate downgraders to determine whether said candidate downgraders correctly downgrade the input.

8. The system of claim 7, wherein the enhancer module is further configured to generate a set of test inputs for each vulnerable flow that includes at least one test input that exploits each vulnerability associated with the vulnerable flow.

9. The system of claim 1, wherein the enhancer module is further configured to add a complete downgrader to any flow that has no downgrader.

10. A non-transitory computer readable storage medium comprising a computer readable program for automatic correction of security downgraders, wherein the computer readable program when executed on a computer causes the computer to perform the steps of:
 performing a security analysis that disregards existing user-provided downgraders to detect flows that are vulnerable;
 locating candidate downgraders on said flows;
 determining whether each of the candidate downgraders protects against all vulnerabilities associated with each downgrader's respective flow; and
 transforming candidate downgraders that do not protect against all of the associated vulnerabilities such that the transformed downgraders do protect against all of the associated vulnerabilities.

* * * * *